United States Patent

[11] 3,633,132

[72] Inventor Pierre Hartemann
Paris, France
[21] Appl. No. 16,875
[22] Filed Mar. 5, 1970
[45] Patented Jan. 4, 1972
[73] Assignee Thomson-CSF
Paris, France
[32] Priority Mar. 12, 1969
[33] France
[31] 6906977

[54] ENERGY-WEIGHTED DISPERSIVE ACOUSTIC DELAY LINE OF THE SURFACE WAVE TYPE
9 Claims, 1 Drawing Fig.

[52] U.S. Cl. .......... 333/30 R, 333/72, 310/9.7, 310/9.8
[51] Int. Cl. .......... H03h 7/30, H03h 9/00
[50] Field of Search .......... 333/72, 70 T, 30; 310/8, 8.1, 8.2, 8.3, 9.7, 9.8, 8.4, 8.5, 8.6, 8.7

[56] References Cited
UNITED STATES PATENTS
3,376,572 4/1968 Mayo .......... 333/30 X
3,310,761 3/1967 Brauer .......... 333/30

*Primary Examiner*—Herman Karl Saalbach
*Assistant Examiner*—Marvin Nussbaum
*Attorney*—Flynn & Frishauf

ABSTRACT: To provide an energy-weighted signal in which the amplitude of the secondary lobes in the signal are essentially suppressed, comb-shaped electrodes having interleaved teeth applied to a piezoelectric wafer equipped with two transducers are dimensioned that at least one of the electrodes has teeth of dissimilar length thus inherently producing weighting of the compressed signal. The tips of the comb-shaped electrodes are arranged in accordance with desired mathematical weighting functions, e.g. a Gauss curve, the Taylor approximation of a Dolph-Tchebychev function, or the Hamming function.

ENERGY-WEIGHTED DISPERSIVE ACOUSTIC DELAY LINE OF THE SURFACE WAVE TYPE

Figure 1:
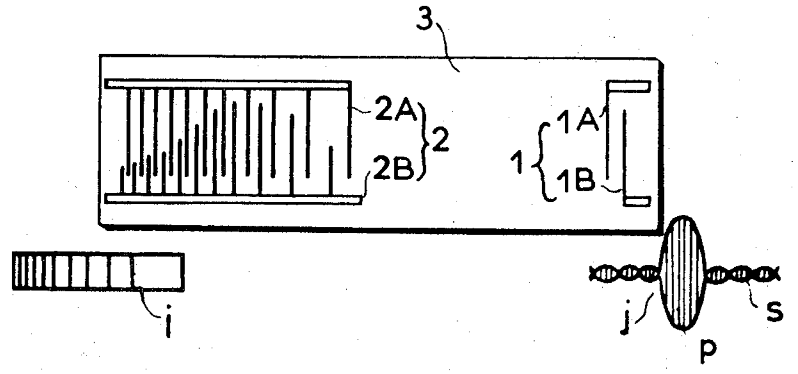

The present invention relates to improvements in dispersive delay lines of the kind in which acoustic surface waves (Rayleigh waves) are produced by piezoelectric means.

Dispersive delay lines are mainly used for the compression and correlation of signals in modern radar signal processing techniques.

A known type of dispersive delay line comprises a substrate of piezoelectric material such as quartz, upon which two combed-shaped electrodes with interleaved arrays of teeth constitute a transducer. When energized by an electrical pulse, a transducer of this kind will generate acoustic surface waves, also known as Rayleigh waves: these waves propagate along the surface of the piezoelectric substrate and cause a stress distribution which penetrates no more than about one wavelength below the surface. The spacing of adjacent teeth is equal to one-half wavelength of the surface wave. In order to reach a second transducer provided on the same substrate, the surface waves take more or less time, hence undergo a greater or lesser degree of delay, according to the position of the transmitting pair of teeth. If the spacing of the teeth varies along the delay line the transducer will produce a series of waves of different frequencies, and the waves of each particular frequency will be delayed differently in accordance with the law of spatial distribution of the teeth. For instance, known spacing laws make it possible to obtain a wave train in which the delay varies linearly as a function of frequency.

The second transducer may be a conventional electrical acoustic energy transducer, or another comb-electrode transducer similar to the one described above, applied to the delay line.

If either of the two transducers is energized by an electrical pulse which is frequency-modulated in accordance with the law of spatial distribution of the teeth, the electrical signal picked up at the terminals of the other transducer will be a compressed signal comprising a main lobe of shorter duration than the frequency-modulated pulse, as well as several side lobes located to either side of the main lobe. If the second transducer is another interlaced electrode array, then the frequency spectrum and duration of the modulated pulse are a function of the structure of the two transducers. For a discussion of the structure and operation of such delay lines, reference is made to U.S. Pat. No. 3,360,749 and literature referred to therein.

Conventional dispersive surface-wave delay lines give rise to compressed signals showing side lobes of substantial magnitude and this is what might be expected from A consideration of the theory of signal autocorrelation. Thus, the compression of a linearly frequency-modulated signal produces a signal of the form sin $x/x$, in which the first and the largest of the side lobes are only about 13 db. below the maximum amplitude of the main lobe. In the detection of radar signals, the side lobes are liable to give rise to ambiguities or to resolution defects. It is the conventional approach to reduce the amplitude of the side lobes by amplitude weighting of the envelope of the transmitted signal or by weighting of the amplitude response of the receiver. Thus, hitherto it has been necessary to associate weighting filters with dispersive lines. Due to their complexity, these filters are bulky, quite expensive and do not provide reproducible results.

The object of the present invention is to provide a dispersive surface-wave delay line which itself carries out the weighting of the signal at the same time that it compresses or expands same.

SUBJECT MATTER OF THE INVENTION

At least one of the comb-electrodes has teeth of dissimilar length; the envelope of the teeth of this electrode, or the combination of the envelope of the teeth in the case where several electrodes have dissimilar teeth, is a curve representative of a weighting function, for example a Gauss curve, the Taylor approximation of a Dolph-Tchebychev function, or the Hamming function.

Figure 2:
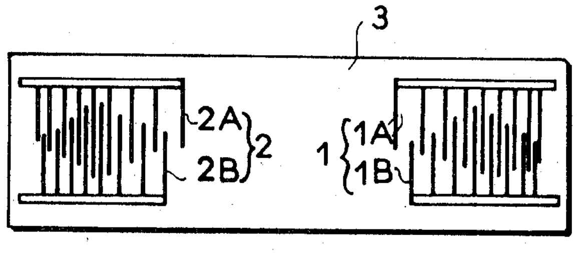

The invention will be described by way of example with reference to the accompanying drawings, wherein;

FIG. 1 is a schematic plan view of a dispersive delay line in accordance with the invention; and FIG. 2, a variant embodiment of the line illustrated in FIG. 1.

The dispersive delay line in accordance with the invention illustrated in FIG. 1, comprises a substrate 3 of piezoelectric material such as quartz, cadmium sulphide, lithium methaniobate, piezoelectric ceramic or the like. Two transducers 1, 2 are arranged in spaced relationship on one major face of the substrate. Each transducer comprises a pair of thin-film metal electrodes (electrodes 1A and 1B in transducer 1, and electrodes 2A and 2B in transducer 2). In the transducer 2, the electrodes 2A, 2B are in the shape of combs with interlaced teeth. They have a substantial length; as en, the arrays of teeth are interleaved. Although the electrodes are shown as having only a few teeth for the purpose of illustration, it is understood that these electrodes may comprise large number of teeth. The spacing between pairs of adjacent teeth increases from one pair to the next commencing from the teeth nearest the edge of the substrate. On one of the electrodes 2A, the teeth have all the same length while, in accordance with the invention, the teeth of the other electrode 2B have different lengths: the envelope describing the tips of the teeth of the electrode 2B corresponds approximately to the curve defining a weighting function. The other transducer 1 is not necessarily a comb-shaped transducer, and if so, it may have teeth of equal spacing and equal length. In other words, the transducer 1 may be a conventional transducer.

In this dispersive delay line, one of the transducers 1 or 2 is provided for launching acoustic surface waves (Rayleigh waves), while the other transducer is provided for picking up the waves. As far as the comb-shaped transducer 2 is concerned, individual surface waves arise (or are picked up) between each pair of teeth. In each particular pair, the surface waves have a wavelength which is proportional to the tooth spacing, and a power which is a function of the tooth length. In operation, a short electrical signal applied to either of the transducers 1 or 2 will be converted into a superficial stress wave, which will propagate on the surface of the substrate 3. This stress will be converted back into an electrical signal by the other transducer. The signal is frequency modulated in accordance with the law of spatial distribution of the teeth (see the aforementioned U.S. Pat. No. 3,360,749). In accordance with the invention, the power radiated at each frequency will be a function of the length of the teeth whose spacing is tuned to this frequency.

Conversely, either of the transducer may be energized by means of a signal which has a duration equal to the time of acoustic propagation along the comb-shaped transducer and is frequency modulated in accordance with the law of spatial distribution of the teeth; the substrate will then have a train of acoustic waves applied thereto which, for each particular frequency, travel over the distance separating the conventional transducer 1 from that point in the other transducer where the spacing of adjacent teeth corresponds to this frequency. The time sequence of these variable-frequency and variable-transit waves is such that the electrical output signal of the other transducer is a compressed signal having a duration much shorter than the original frequency-modulated signal. By way of illustration, symbols designating a long pulse I and a compressed pulse J, have been shown in FIG. 1, near each edge of the dispersive line. It will be seen that on either side of a main lobe $p$, the compressed signal J exhibits side lobes $s$.

If the dispersive line is designed in accordance with the present invention, that is to say with at least one of the comb-shaped electrodes 2A or 2B having teeth of dissimiliar length, then it will be seen that the side lobes all have a small amplitude while a dispersive delay line designed in accordance with the prior art concept, with comb-shaped electrodes whose teeth are all equal in length, would have produced a compressed pulse the first side lobes of which would have been larger, for example only about 13 db. below the maximum amplitude of the main lobe in the case of a linear frequency modulation function.

The result which the present invention secures, that is to say the radical reduction of the side lobes, is due to the fact that the acoustic power radiated by the transducer 2 is not the same at all the frequencies involved, as a consequence of the dissimilarity in length of the teeth. The process takes place in the same way as if the compressed signal J were the resultant of several waves among which some would have their lobes in antiphase relatively to the lobes of the others; in a signal of this kind, the main lobe might be slightly stretched in time and reduced in amplitude, but the side lobes would be drastically attenuated.

The attenuation of the side lobes is particularly marked if the envelope describing the tips of the teeth in the electrode 2B which has teeth of dissimilar length, approximates the curve defining a weighting function.

The embodiment described with respect to FIG. 1, is an example and various changes may be made. For example, both comb-shaped electrodes of the transducer may have teeth of dissimilar length. Thus, the same favorable result as before is obtained, if the combination of the envelopes describing the teeth approximates to the curve defining a weighting function.

In accordance with another embodiment, each of the two transducers 1, 2 of the dispersive delay line comprises two comb-shaped interleaved electrodes, and at least one of these electrodes has teeth of dissimilar length. In FIG. 2, there has been illustrated by way of example a delay line in which both transducers 1', 2' comprise a pair of comb-shaped interleaved electrodes 1A', 1B', 2A', 2B' having teeth of dissimilar length. In a delay line of this kind, each transducer participates in the compression of the pulses applied to one of them, and the combination of the enveloped of teeth combines to form a curve representative of a weighting function.

The problems of weighting are well known to those skilled in in the art and are encountered in various areas of technology, in particular in order to find distribution functions which, in antenna feeder systems, will produce the weakest lateral lobes without interferring with the directional characteristics for efficiency of the antenna; problems of similar nature have been investigated in optics. Applied to the compression of pulses, weighting functions have found uses in the construction of weighting filters, which are conventionally associated with compressing devices. It will be remembered that the present invention seeks to render the addition of this kind of equipment superfluous. Amongst the various weighting functions most widely used at the present time are the Gauss curve, Taylor's approximation to the Dolph-Ichebychev function, and the Hamming function.

A dispersive delay line of the type of FIG. 1 may, by way of example be constructed as follows: A slab 5 of quartz, about 40 mm. long and 10 mm. wide, is used; the slab has been Y-cut and propagation is along the X-axis. The transducers 1 and 2 are produced by plating on aluminum film on the surface of the slab 3 and then etching away portions thereof in the comb-shaped transducer, the spacing between the teeth varies in accordance with a known 1aw in such fashion that the delay experienced by the acoustic waves is a linear function of the frequency. In the comb electrode having teeth of dissimilar length, the envelope describing the tips of the teeth matches with Taylor's approximation to a Dolph-Tchebychev function. This line was operated by applying to it a 4-microsecond pulse linearly frequency modulated with a sweep of 5.5 mHz., centered on a frequency of 14 mHz. A compressed pulse was obtained which, at −3 db. of its peak amplitude, had a duration of 0.2 microseconds approximately. The first side lobes had amplitudes of −30 db. below the amplitude of the main lobe.

It will be seen that the dispersive delay line in accordance with the invention makes it possible to obtain a compressed pulse in which the side lobes are drastically attenuated. This attenuation is produced by a weighting effect which is inherent in the line, that is to say without having to resort to extraneous weighting filters. MOreover, the weighting obtained is easily reproducible since a single photoetching mask can be used to produce large numbers of delay lines all of which will be identical with one another.

I claim:

1. A dispersive acoustic delay line of the surface wave type embodying along its transmission path a nonuniform energy distribution described by a weighting function, said delay line comprising:
- a body (3) of piezoelectric material;
- two transducers (1, 2) at least one of which includes two comb-shaped electrodes having interleaved teeth, applied to said body;
- at least one of the comb-shaped electrodes (2B) having teeth of dissimilar length, the envelope of the tips of the teeth approximating a curve representing said weighting function.

2. A delay line as claimed in claim 1, where the body or piezoelectric material (3) is of a material: quartz, or cadmium sulphide, or piezoelectric ceramic, or lithium methaniobate.

3. A delay line as claimed in claim 1, wherein the transducers (1, 2) include a photoengraved, vacuum, vapor-deposited metal film.

4. A delay line as claimed in claim 1, wherein one of the comb-shaped electrodes are of the same length, and the other comb-shaped electrodes are of dissimilar length.

5. A delay line as claimed in claim 1, wherein both comb-shaped electrodes of at least one of the transducers are of dissimilar length, the combination of envelopes of the tips of the teeth of the electrodes forming said weighted function.

6. A delay line as claimed in claim 1, wherein both comb-shaped electrodes of both transducers are of dissimilar length, the combination of the envelopes of the tips of the teeth of the electrodes of any one transducer forming said weighting function.

7. A delay line as claimed in claim 1, wherein said weighting function represents a gaussian distribution.

8. A delay line as claimed in claim 1, wherein said weighting function is a Taylor's approximation to a Dolph-Tchebychev function.

9. A delay line as claimed in claim 1, wherein said weighting function is a Hamming function.

* * * * *